(12) United States Patent
Lotero et al.

(10) Patent No.: US 8,629,310 B2
(45) Date of Patent: Jan. 14, 2014

(54) TRANSPORTATION FUELS FROM BIOMASS OXYGENATES

(75) Inventors: Edgar Lotero, Cleveland, OK (US); Kristi Fjare, Bartlesville, OK (US); TiePan Shi, Bartlesville, OK (US); Sourabh Pansare, Bartlesville, OK (US); Yun Bao, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 5 days.

(21) Appl. No.: 13/416,533

(22) Filed: Mar. 9, 2012

(65) Prior Publication Data

US 2013/0237728 A1 Sep. 12, 2013

(51) Int. Cl.
*C07C 1/207* (2006.01)

(52) U.S. Cl.
USPC ............ 585/327; 585/328; 585/316; 585/733

(58) Field of Classification Search
None
See application file for complete search history.

(56) References Cited

U.S. PATENT DOCUMENTS

| | | | |
|---|---|---|---|
| 7,501,546 B2 * | 3/2009 | Koivusalmi et al. | 585/327 |
| 2007/0135666 A1 * | 6/2007 | Koivusalmi et al. | 585/20 |

* cited by examiner

*Primary Examiner* — Tam M Nguyen
(74) *Attorney, Agent, or Firm* — Phillips 66 Company

(57) ABSTRACT

Oxygenate feedstocks derived from biomass are converted to a variety of fuels including gas, jet, and diesel fuel range hydrocarbons. General methods are provided including hydrolysis, dehydration, hydrogenation, condensation, oligomerization, and/or a polishing hydrotreating.

12 Claims, 8 Drawing Sheets

TRANSPORTATION FUELS FROM BIOMASS OXYGENATES

CROSS-REFERENCE TO RELATED APPLICATIONS

None.

STATEMENT REGARDING FEDERALLY SPONSORED RESEARCH

None.

FIELD OF THE INVENTION

Oxygenate feedstocks derived from biomass are converted to a variety of fuels including gas, jet, and diesel fuel range hydrocarbons. In one embodiment a hydrocarbon fuel is produced from biomass oxygenates through hydrolysis, dehydration, hydrogenation, stabilization, condensation, oligomerization, and/or a polishing hydrotreating.

BACKGROUND OF THE INVENTION

The Renewable Fuel Standards (RFS) mandate will require higher volumes of advanced biofuels in the near future. This increasing need for biofuels means that future biofuel stocks will need to be fungible at high concentrations with current transportation fuels. Established biofuels, such as ethanol and biodiesel, present serious performance and stability problems due to the presence of oxygen, instability, corrosiveness and low energy equivalents.

Ethanol is the best known and most used biofuel around the world. Ethanol is directly used with gasoline at up to 10 v/v % blends in the US. Higher than 15% blends may cause unacceptable corrosion in both blending equipment and consumer cars that are not specifically equipped to deal with this biofuel. Biodiesel is also a well known biofuel used as a diesel substitute. Some states in US already require biodiesel/diesel blends of up to 2% biodiesel. Biodiesel, however, can cause engine fouling problems when used during the winter with low temperatures due to unfavorable cold flow properties. Biodiesel can also present storage and stability problems. Due to the unsaturated nature of the hydrocarbon moieties in biodiesel and the unstable oxidative bonds, fatty esters undergo hydrolysis reactions increasing the acidity of the fuel and, hence, its corrosiveness. In addition bacterial growth can take place on biodiesel during long storage periods. Finally, biodiesel viability is constrained by the current cost and availability of vegetable oils and animal fats used for its preparation. Because ethanol and biodiesel are not fungible in the current fuel system, have low energy equivalents, and corrosiveness/instability problems, other renewable fuel options need to be investigated.

Several researchers have proposed different avenues for biofuel synthesis from oxygenate precursors. Recently, Dumesic and co-workers disclosed the use of gamma-valerolactone (GVL) for biofuel synthesis (Bond, et al., 2010). Their proposed strategy includes GVL decarboxylation to butenes using a $SiO_2$—$Al_2O_3$ catalyst at 375-400° C. and 529 psi (WHSV=0.09-0.9 $h^{-1}$). The product gas stream containing butenes is passed through a separator to remove water and then is sent to a second reactor containing either ZSM-5 or Amberlyst-70 for oligomerization to C8+ olefins. GVL conversions were reported between 70-99% with butene yields in the 35-96% range. In a second reaction, butane oligomerization conversions varied from 0-93%. Dumesic and co-workers have recently also proposed the use of levulinic acid for the synthesis of $C_9$ linear hydrocarbons (Serrano-Ruiz, 2010). They state that through isomerization $C_9$ paraffins should make good gasoline components. They propose using a linear $C_9$ paraffin as a diesel component given its good cetane number. Unfortunately some $C_9$ paraffins may be too light for diesel blending. Another strategy for diesel fuel synthesis is the oligomerization of $C_9$ olefins obtained from the dehydration of 5-nonanol. The 5-nonanol may be obtained directly from the hydrogenation of 5-nonanone that is the ketonization product of valeric acid (VA). Recently, Huber and co-workers propose a four-step process for the production of jet and diesel fuel range hydrocarbons alkanes from hemicellulose extracts. The first step in this process was an acid-catalyzed biphasic dehydration to produce furfural. The furfural was extracted from the aqueous solution into a tetrahydrofuran (THF) phase which was then fed into an aldol condensation step. The furfural-acetone-furfural (F-Ac-F) dimer was produced in this step by reaction of furfural with acetone. The F•Ac-F dimer was then subjected to a low-temperature hydrogenation to form the hydrogenated dimer (H-FAF) at 110-130° C. and 800 psig with a 5 wt % Ru/C catalyst. Finally the H-FAF underwent hydrodeoxygenation to make jet and diesel fuel range alkanes, primarily $C_{13}$ and $C_{12}$ range hydrocarbons.

Ostuka and associates, U.S. Pat. No. 3,752,849, manufacture levulinic acid by ring cleavage of furfuryl alcohol. Fitzpatrick, U.S. Pat. No. 4,897,497 and U.S. Pat. No. 5,608,105, produces furfural and levulinic acid from lignocellulose and levulinic acid from carbohydrate-containing materials in high yields using two reactors in which the temperature, reaction time, and acid content are closely controlled. Van de Graaf and Lange, U.S. Pat. No. 7,265,239, use a porous strong acid ion-exchange resin as a catalyst for the conversion of furfuryl alcohol with water or an alkyl alcohol into levulinic acid or alkyl levulinate.

A variety of oxygenates can be derived from biomass carbohydrates through various techniques including acid hydrolysis, pyrolysis, fermentation, and the like. Oxygenates can be obtained via carbohydrate hydrolysis/dehydration under severe reaction conditions, i.e., temperature $\geq 180°$ C. and catalyst concentration $\geq 1$ wt % (U.S. Pat. No. 4,897,497 and U.S. Pat. No. 5,608,105; Biometic I, 2002; Fitzpatrick, 2006; De Jong, 2010). Additionally, carbohydrate hydrolysis/dehydration can be carried out in the presence of alcohols. When alcohols are present a levulinic acid ester can also be obtained in high yields. Thus, for instance, if ethanol is introduced during the carbohydrate hydrolysis/dehydration, major products include ethyl levulinate, levulinic acid and furfurals. Depending on the reactor system used for the hydrolysis/dehydration step, furfurals and formic acid can be produced as gas phase products. When this is the case, furfurals in the gas phase can be easily hydrogenated to furfurol (Chen, 2002; Wu, 2005). Furfural can be fed to the hydrolysis/dehydration reactor to be converted to levulinic acid and/or alkyl levulinate via hydrolysis (Otsuka, 1973; Olson, 2001; van de Graaf, 2007; Lang, 2008). The levulinate and furfural products from the hydrolysis/dehydration step can be separated from water and other byproducts (tars and solid char) using a variety of separation techniques. Separation technologies including filtration, decantation, solvent extraction, and distillation, can be used to obtain purified levulinate and furfural. Levulinate, furfural, and other oxygenates are not heat stable and need to be stabilized for further processing.

Unfortunately, most biofuels cannot be used as a gasoline substitute, but must be blended with gasoline, as is the case with cellulosic ethanol. Synthesis of hydrocarbons from biological sources is limited, a more efficient and fungible source of renewable fuels is required. Thus far, there remains a need for technologies that are able to provide biomass-derived hydrocarbon fuels including gasoline, diesel and jet fuels that can be used interchangeably with a wide range of petroleum based fuels.

BRIEF SUMMARY OF THE DISCLOSURE

The present invention fills the existing technology gap providing not only renewable gasoline range hydrocarbons, but also renewable diesel and jet-fuel hydrocarbons from biomass sources. The techniques described here for biomass upgrading to hydrocarbons apply to a wide range of biomass derived oxygenates including furfurals, carboxylic acids, esters, ethers, alcohols, polyols, aldehydes, and ketones, among others. Oxygenates are upgraded to a renewable hydrocarbon fuel through hydrogenation, condensation/oligomerization, and polishing hydrotreating. Upgraded fuels may be distilled into a variety of renewable hydrocarbon fuels including gasoline, diesel, vacuum gas oils (VGO), and/or jet-fuel. The disclosed technology may be used with any oxygenate feed derived from biomass or other sources of oxygenates.

In one embodiment, a method of converting biomass oxygenates into renewable hydrocarbon fuels is described by providing a biomass derived oxygenate feed; hydrogenating the oxygenate feed with a hydrogenation catalysts to produce a hydrogenated product; condensing the hydrogenated product with a condensation catalyst to produce a condensed or oligomerized product; polishing the condensed or oligomerized product with a hydroprocessing catalyst (HPC) to produce hydrocarbon range fuel products; and isolating one or more hydrocarbon range fuel products.

In another embodiment, a method of converting biomass oxygenates into hydrocarbon fuels is described by providing a biomass derived oxygenate feed and a hydrogen source; hydrogenating the oxygenate feed with a hydrogenation catalysts to produce a hydrogenated product; separating alcohol from the hydrogenated product; condensing the hydrogenated product with a condensation catalyst to produce a condensed or oligomerized product; polishing the condensed or oligomerized product with an HPC to produce hydrocarbon range fuel products; and isolating one or more hydrocarbon range fuel products.

Additionally, an apparatus for converting biomass oxygenates into hydrocarbon fuels is demonstrated having a biomass derived oxygenate feed and a hydrogen feed; a hydrogenation catalysts to hydrotreat the oxygenate feed an produce a hydrogenated product; a condensation catalyst to condense, oligomerize, or both condense and oligomerize the hydrogenated product producing a condensed or oligomerized product; a HPC to polish the condensed or oligomerized product producing hydrocarbon range fuel products; and one or more separators to isolate one or more hydrocarbon range fuel products.

In another embodiment, a renewable hydrocarbon fuel containing naphtha, distillate, and/or VGO range hydrocarbons, is produced from biomass oxygenates by providing a biomass derived oxygenate feed; condensing the biomass oxygenates with a condensation catalyst to produce a condensed or oligomerized product, polishing the condensed or oligomerized product with a HPC to produce hydrocarbon range fuel products, and isolating one or more hydrocarbon range fuel products.

In one embodiment the oxygenate feedstock is derived from a biomass containing sugars, carbohydrates, lignins, fatty acids, proteins, oils, eucalyptus oil, forest residues, dead trees, branches, leaves, tree stumps, yard clippings, wood chips, wood fiber, sugar beets, miscanthus, switchgrass, hemp, corn, corn fiber, poplar, willow, sorghum, sugarcane, palm oil, corn syrup, algal cultures, bacterial cultures, fermentation cultures, paper manufacturing waste, farming residues, food manufacturing waste, meat processing waste, municipal solid waste, animal waste, biological waste, sewage, and combinations thereof. The oxygenate feedstock may contain one or more oxygenates including carbohydrates, sugars, pentoses, hexoses, monosaccharides, dextrose, glucose, $\alpha$-D-glucopyranose, $\beta$-D-glucopyranose, $\alpha$-D-glucofuranose, $\beta$-D-glucofuranose, fructose, galactose, disaccharides, levoglucosan, sucrose, manose, glucose, xylose, isosorbide, lactose, maltose, fructose, cellobiose, melibiose, raffinose, glyceraldehyde, erythritol, xylitol, sorbitol, arabitol, mannitol, sorbitol, dulcitol, maltitol, arabinitol, isosorbide, glycerol, glycerin, alcohol, methanol (MeOH), ethanol (EtOH), isopropyl alcohol (IPA), butanol (BuOH), n-butanol, t-butanol, ethers, methyl tert-butyl ether (MTBE), tertiary amyl methyl ether (TAME), tertiary hexyl methyl ether (THEME), ethyl tertiary butyl ether (ETBE), tertiary amyl ethyl ether (TAEE), diisopropyl ether (DIPE), hydroxymethyl-tetrahydrofuran or tetrahydro-2-furfuryl alcohol (THFA), methyl-tetrahydrofuran, 2-methyltetrahydrofuran, 3-methyl-tetrahydrofuran, tetrahydrofuran, diols, methanediol (H2C(OH)2), ethylene glycol, propane diols, 1,2-propanediol, 1,3-propanediol, butanediols, 1,2-butanediol, 1,3-butanediol, 1,4-butanediol, 2,3-butanediol, pentane diols, 1,2-pentanediol, 1,5-pentanediol, octanediol, 1,8-octanediol, etohexadiol, p-menthane-3,8-diol, 2-methyl-2,4-pentanediol, aldehydes, propanal, butanal, 2,5-furan-diacrboxyaldehyde, carboxylates, acetic acid, oxopropanoic acid, acrylic acid, levulinic acid, succinic acid, 2,5-furan-dicarboxylic acid, aspartic acid, glucaric acid, glutamic acid, itaconic acid, acetylacrylic acid, 4-O-Me-glucuronic acid, gluconic acid, xylonic acid, esters, levuninate esters, lactones, valero lactone, $\alpha$-methylene-$\gamma$-valerolactone, angelica lactones, trisaccharides, oligosaccharides, polysaccharides, starch, derivatives, dimers, trimers, and polymers thereof.

In another embodiment, the biomass oxygenates are converted under the following reaction conditions: the oxygenate may be hydrogenated at temperatures between approximately 100 and 400° C. and pressures between approximately 100-1200 psig, including temperatures of approximately 100° C., 125° C., 150° C., 175° C., 200° C., 225° C., 250° C., 275° C., 300° C., 325° C., 350° C., 375° C., or 400° C. and pressures of approximately 100 psig, 200 psig, 300 psig, 400 psig, 500 psig, 600 psig, 700 psig, 800 psig, 900 psig, 1000 psig, 1100 psig, or 1200 psig; the hydrogenated product may be condensed and/or oligomerized at temperatures between approximately 200 and 600° C. and pressures between approximately 100-1200 psig, including temperatures of approximately 200° C., 225° C., 250° C., 275° C., 290° C., 300° C., 325° C., 350° C., 375° C., 400° C., 425° C., 450° C., 475° C., 500° C., 525° C., 550° C., 575° C., or 600° C. and pressures of approximately 100 psig, 200 psig, 300 psig, 400 psig, 500 psig, 600 psig, 700 psig, 800 psig, 900 psig, 1000 psig, 1100 psig, or 1200 psig; and the condensed and/or oligomerized product may be polished at temperatures between approximately 200 and 400° C. and pressures between approximately 100-1800 psig, including temperatures of approximately 200° C., 225° C., 250° C., 275° C., 290° C., 300° C., or 350° C., and pressures of approximately 100 psig, 200 psig, 300 psig, 400 psig, 500 psig, 600 psig, 700 psig, 800 psig, 900 psig, 1000 psig, 1100 psig, 1200 psig, 1400 psig, 1600 psig, or 1800 psig.

Additionally, the hydrogenation catalysts may be a catalyst containing ceria (Ce), magnesium (Mg), nickel (Ni), cobalt. (Co), gold (Au), iridium (Ir), osmium (Os), palladium (Pd), platinum (Pt), rhodium (Rh), ruthenium (Ru) and combinations thereof. The condensation catalyst may be a catalyst containing alumina, silica, silica-alumina, zirconia, titania, ceria, manganese oxide, magnesium, praseodymium oxide, samarium oxide, and combinations thereof. The condensation catalyst may also have a promoter consisting of copper (Cu), nickel (Ni), cobalt (Co), gold (Au), iridium (Ir), osmium (Os), palladium (Pd), platinum (Pt), rhodium (Rh), and combinations thereof. Finally, the polishing catalyst may be a catalyst containing molybdenum (Mo), tungsten (W), cobalt (Co), nickel (Ni), NiW, NiMo, CoMo, and combinations thereof. The polishing catalyst support may be a carbon, alumina, silica, zeolite, ceramic, $Al_2O_3$, or similar catalyst support.

In one embodiment, the hydrocarbon range fuel products are distilled to one or more renewable hydrocarbon fuels selected form the group consisting of gasoline, diesel, and jet-fuel. In another embodiment, hydrocarbon range fuel products are mixtures of different hydrocarbon types with different carbon numbers and where product composition is dominated by naphthene hydrocarbon type hydrocarbons.

In one embodiment, the hydrogenation is conducted under one of the following conditions:
 the oxygenate comprises levulinic acid, the hydrogenation catalyst is ruthenia carbon catalyst, the temperature is approximately 100-150° C., and pressure is approximately 400-1000 psig;
 the oxygenate comprises levulinic acid, the hydrogenation catalyst is a nickel-based catalyst, the temperature is approximately 200-250° C., the pressure is approximately 800-1000 psig, The condensation is conducted under one of the following conditions:
 the oxygenate comprises gamma-valerolactone (GVL), the condensation catalyst is ceria alumina, the temperature is approximately 400° C. and the pressure is approximately 800-1000 psig,
 the oxygenate comprises gamma-valerolactone (GVL), the condensation catalyst is magnesia alumina, the temperature is approximately 400° C. and the pressure is approximately 800-1000 psig,
 the oxygenate comprises tetrahydrofurfuryl alcohol, the condensation catalyst is ceria alumina, the temperature is approximately 400° C. and the pressure is approximately 800-1000 psig,
 the oxygenate comprises levulinic acid, the condensation catalyst is a noble-metal catalyst, the temperature is approximately 200-340° C. and the pressure is approximately 1200 psig;
 the oxygenate comprises sorbitol, the condensation catalyst is a praseodymium oxide-alumina catalyst, the temperature is approximately 280-400° C. and the pressure is approximately 800-1200 psig;
 the oxygenate is a levulinic acid/formic acid mixture, the condensation catalyst is a praseodymium oxide-alumina catalyst, the temperature is approximately 280-400° C. and the pressure is approximately 800-1200 psig; and The polishing under one of the following conditions:
 hydrotreating catalyst is a sulfided HPC, the temperature is approximately 240-320° C., and the pressure is approximately 800-1200 psi;
 the polishing catalyst is a sulfided HPC, the temperature is approximately 280-350° C., and the pressure is approximately 800-1200 psi.
 the polishing catalyst is a non-sulfided hydroprocessing catalystHPC, the temperature is approximately 280-380° C., and the pressure is approximately 800-2000 psi.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
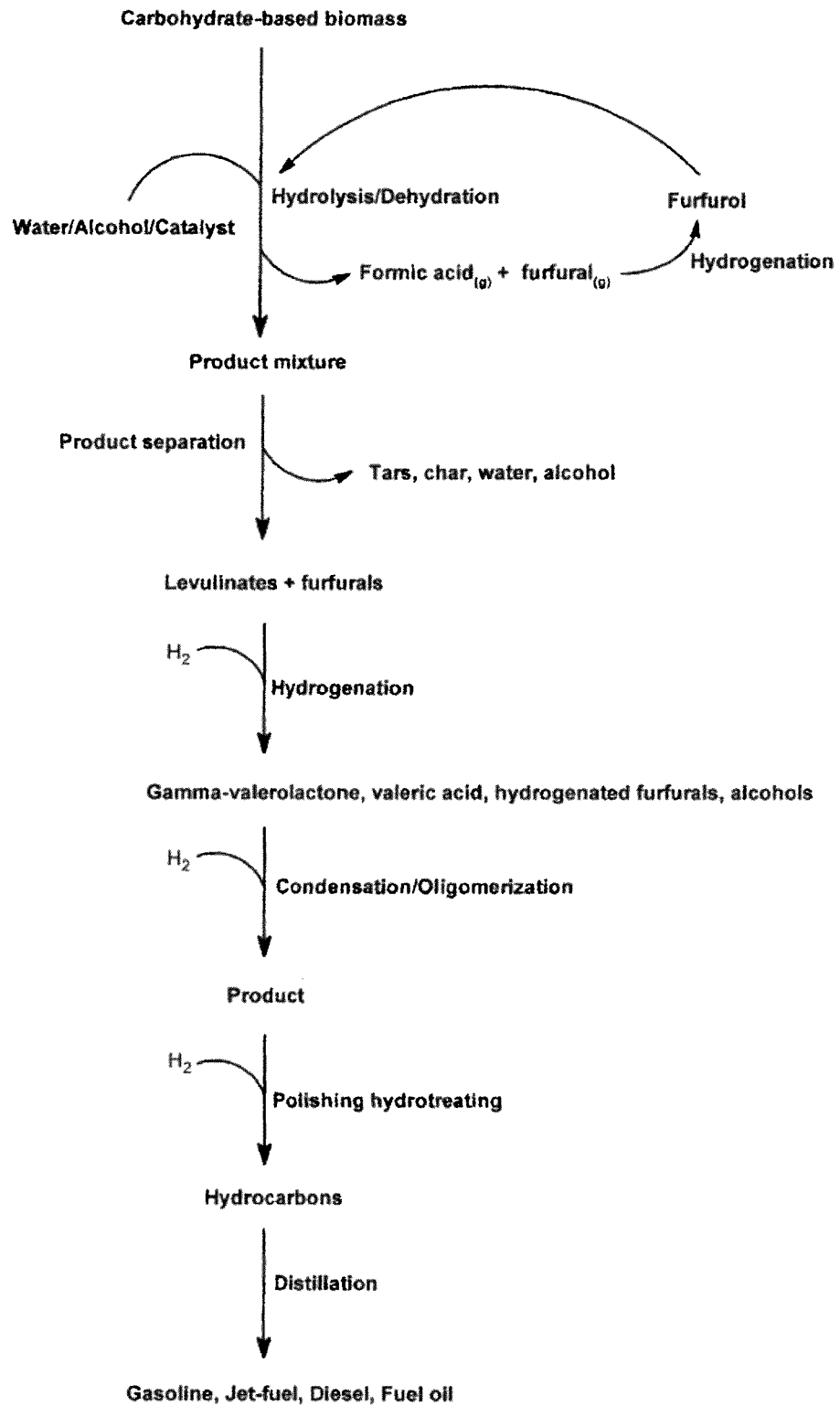
FIG. 1: Schematic representation of one embodiment of the processing steps

In one embodiment, hydrocarbon fuels are produced from biomass oxygenates through hydrolysis/dehydration, separation of solids and water, hydrogenation, condensation/oligomerization, polishing and distillation to gasoline, jet-fuel, diesel and gasoil (FIG. 1).

Carbohydrate-based biomass, as used herein, refers to biomass where a fraction of its composition is made of carbohydrates. Carbohydrate-based biomasses are available from a variety of sources including cellulosic biomass and algal biomass. Other biomass/oxygenate sources include sugars, carbohydrates, lignins, fatty acids, proteins, oils, eucalyptus oil, forest residues, dead trees, branches, leaves, tree stumps, yard clippings, wood chips, wood fiber, sugar beets, miscanthus, switchgrass, hemp, corn, corn fiber, poplar, willow, sorghum, sugarcane, palm oil, corn syrup, algal cultures, bacterial cultures, fermentation cultures, paper manufacturing waste, farming residues, food manufacturing waste, meat processing waste, municipal solid waste, animal waste, biological waste, and/or sewage.

The main products from biomass carbohydrates after hydrolysis/dehydration treatment include levulinic acid and furfurals derived from C5 and C6 sugar dehydration reactions (including furfural and hydroxymethylfurfural, respectively). Separated oxygenate products are stabilized to eliminate oxygenates that are thermally unstable. Stabilization may be conducted using different hydrogenation catalysts. Hydrogenation catalysts include, but are not limited to, nickel (Ni), cobalt.(Co), noble metal-based (Au, Ir, Os, Pd, Pt, Rh, Ru) as supported and nonsupported hydrogenation catalysts. The stabilization step is commonly carried out at temperatures ≤300° C. and pressures between 100-1200 psig. Products from the hydrogenation step include GVL and VA derived from levulinates, hydrogenated furfural products, such as tetrahydrofurfuryl alcohol and 1,5-dihydroxydimethyl THF, and aliphatic alcohols; the latter usually $C_{4-6}$ alcohols may originate from both levulinates and furfurals.

The products from the stabilization-hydrogenation step undergo condensation/oligomerization reactions at temperatures above 200° C. and pressures above 100 psig using catalysts that allow a wide range of chemistries to occur. Some of these catalysts include, but are not limited to, alumina, silica, silica-alumina, zirconia, titania, ceria-, manganese oxide-, and magnesia-based catalysts, promoted or non-promoted with metals, such as Cu, Ni, Co, noble metals (Au, Ir, Os, Pd, Pt, Rh, Ru), and combinations thereof. The condensation/oligomerization stage can use unreacted hydrogen from the stabilization stage previously described. The presence of residual hydrogen in this stage allows longer catalyst life. If desired, additional hydrogen can be added to select different chemistries occurring on the catalyst surface. Overall, this step increases the molecular size of the species present forming adequate precursors to hydrocarbons in the gasoline, diesel, and jet-fuel range. During this step oxygen is also eliminated in the form of water and carbon oxides. After the condensation/oligomerization stage the product still contains oxygen. In order to completely remove oxygen a final polishing hydrotreating step is necessary. The hydrotreating step can be conducted using conventional hydrotreating technology involving sulfided cobalt- and nickel-molybdenum catalysts. The polishing hydrotreating step can also be carried out using non-sulfided metal-based hydrotreating catalysts.

A base-metal or hydroprocessing (HPC) catalyst includes NiW, NiMo, CoMo and the like on $Al_2O_3$, zeolite, or other substrate. HPC catalysts may contain metals and combinations of metals with molybdenum, tungsten, cobalt, or nickel. HPC catalysts are commercially available from a variety of sources including BASF, Nippon Ketjen Co., Haldor Topsøe AS, Albemarle®, W.R. Grace & Co., Axens, Gentas, and others.

Figure 2:
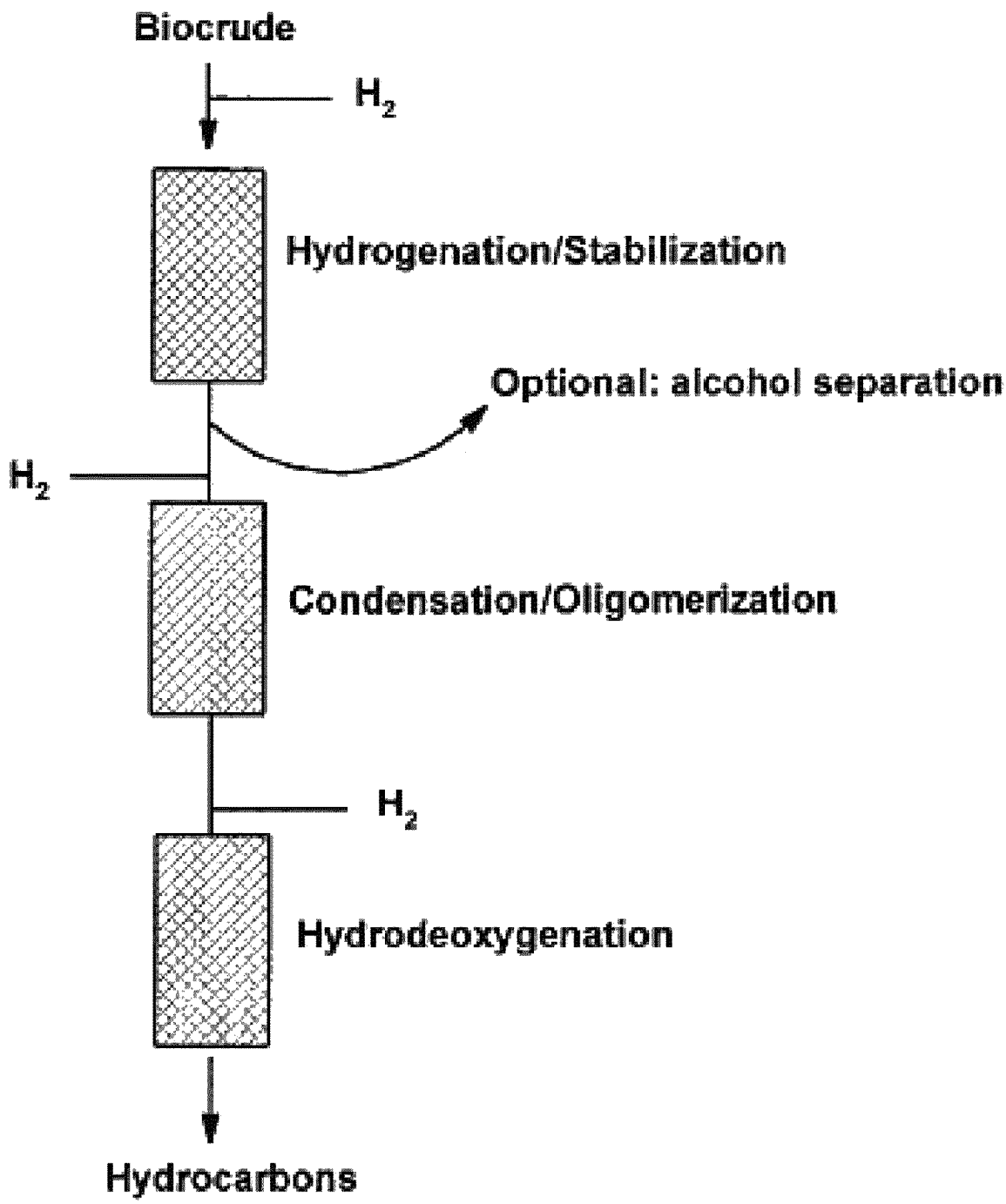
FIG. 2: Schematic representation of a three reactor in series system.

Processing systems can be designed such that feed-stabilization (initial hydrogenation), condensation/oligomerization, and polishing hydrotreating, are carried out with no separation between steps improving the efficiency of the whole operation. If desired, however, alcohol separation can take place after the initial hydrogenation step to recycle alcohol when used during the hydrolysis/dehydration step. In one embodiment, a three reactor in series system can be used for the application (FIG. 2). In another embodiment, one or more reactor systems use a multi-bed catalyst for two or more processes. In one embodiment the feed is stabilized through initial hydrogenation, the alcohol is separated, subsequently the hydrocarbons are condensed/oligomerized and polished in a single reactor with stacked beds. In another embodiment, feed-stabilization (initial hydrogenation), condensation/oligomerization, and polishing hydrotreating, are conducted in a single reactor over a stacked bed catalyst system. In this instance, alcohols present would be consumed during hydrogenation and oligomerization, any remaining alcohols would be converted to lighter hydrocarbons during polishing.

The following examples of certain embodiments of the invention are given. Each example is provided by way of explanation of the invention, one of many embodiments of the invention, and the following examples should not be read to limit, or define, the scope of the invention.

Example 1

50% wt Levulinic Acid

Levulinic acid as a 50 wt % solution in water was fed to a packed-bed reactor containing a 5 wt % Ru/C catalyst at 100° C. 400 psig ($H_2$) and WHSV=0.5. Table 1 shows results for the experiment.

TABLE 1

Results from the hydrogenation of levulinic acid on Ru/C (unidentified products are not shown).

| Product | % Levulinic acid conversion | % YIELD | | | |
|---|---|---|---|---|---|
| | | GVL | 1,4-Pentanediol | 2-Butanol | 2-Pentanol |
| Day 1 | 99.8 | 46.8 | 8.42 | 1.44 | 1.4 |
| Day 2 | 99.7 | 62.5 | 12.97 | 2.9 | 3.3 |
| Day 3 | 99.8 | 60.1 | 12.3 | 3.5 | 4 |

The Ru/C catalyst was stable under the reaction conditions. Levulinic acid was converted to hydrogenated products including GVL, 1,4 pentanediol, 2-butanol, and 2-pentanol. These hydrocarbons are good precursors for subsequent isomerization, dehydrogenation, and/or other upgrading.

Example 2

80% wt Levulinic Acid

Levulinic acid as a 80 wt % solution in water was fed to a nickel-based catalyst at 200-250° C., 800 psig, LHSV=0.1 $hr^{-1}$, $H_2$/LVA mol ratio=13. The conversion of levulinic acid was in the vicinity of 90% at 200 and 250° C.

TABLE 2

Conversion of levulinic acid on a nickel-based catalyst

| Temperature, ° C. | 200 | 250 |
|---|---|---|
| Conversion, % | 93% | 89% |
| Selectivity | | |
| GVL | 98% | 13% |
| VA | 2% | 76% |

Changing the temperature from 200° C. to 250° C. changed the selectivity of the product producing more GVL at 200° C. and more VA at 250° C. (Table 2). The hydrogenation conditions can be controlled to generate unique, desirable fuel precursors for oligomerization to useful fuel products.

Example 3

20% vol Furfural in Ethanol

Figure 3:
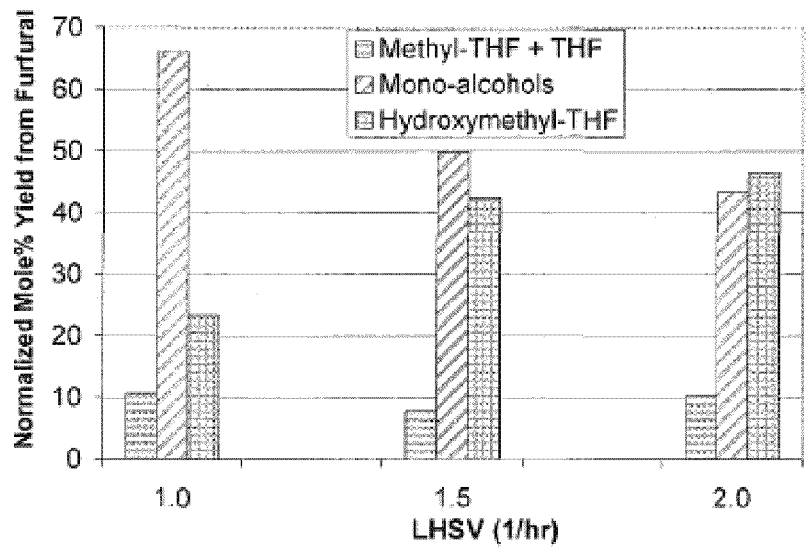
FIG. 3: Normalized mole % yields of products from hydrogenation of furfural.

Hydrogenation of furfural was conducted over a 1 wt % Ru/$TiO_2$ catalyst. The feed was 20 vol % furfural in 80 vol % ethanol. Reaction conditions were controlled at 200° C., 1000 psig, and a hydrogen flow of 400 mL/min. Liquid hourly space velocity (LHSV) was varied from 1.0 $h^{-1}$ to 2.0 $h^{-1}$. Furfural was completely converted at the reaction conditions. The major products were mono-alcohols (1-butanol, 1-pentanol, 2-pentanol), hydroxymethyl-THF, methyl-THF and THF. Product mole % yields are shown in FIG. 3.

Example 4

20% Vol Furfural in Hydroxymethyl-THF

Hydrogenation of furfural (20 vol % furfural in 80 vol % hydroxymethyl tetrahydrofuran (hydroxymethyl-THF)) was conducted over a 5% Ni-1% Ru/C catalyst. The reaction conditions were controlled at a temperature of 200° C., pressure of 1,000 psig, hydrogen flow of 400 mL/min, and liquid hourly space velocity (LHSV) of 1.0 $h^{-1}$. Furfural was completely converted to a variety of major products including mono-alcohols (1-butanol, 1-pentanol, 2-pentanol), Me-THF, and THF (data not shown).

Example 5

Ceria Catalyst

A Cu/$CeO_x$/$Al_2O_3$ catalyst precursor was prepared according to the following procedure: 26.5 g of $Ce(NO_3)_2.6H_2O$ and 3.2 g $Cu(NO_3)_2.6H_2O$ were dissolved in 120-150 mL deionized water. Forty grams of gamma alumina was added to the solution and the water was allowed to evaporate at 80-90° C. After water evaporation, the resulting material was oven dried at 120° C. for 24 h.

Example 6

Magnesium Catalyst

A Cu/MgO/$Al_2O_3$ catalyst precursor was prepared according to the following procedure: 28.24 g $Mg(NO_3)_2.6H_2O$ and 4.08 g $Cu(NO_3)_2\times 6H_2O$ were dissolved in 100-150 mL deionized water. Forty grams of gamma alumina was added to the solution and the water was evaporated at 80-90° C. After water evaporation, the resulting material was oven dried at 120° C. for 24 h. The dried material was then pre-calcined in a furnace at 400° C. for 4-8 h. Table 3 shows textural properties and elemental composition for the catalytic materials after calcination for examples 5 and 6.

TABLE 3

Catalyst elemental composition and textual properties

| CuO/$CeO_x$/$Al_2O_3$ | | CuO/MgO/$Al_2O_3$ | |
|---|---|---|---|
| | Wt % | | Wt % |
| Cu | 2 | Cu | 3 |
| Ce | 18 | Mg | 6 |
| Al | 39 | Al | 46 |
| BET S.A. ($m^2/g$) | 183 | BET S.A. ($m^2/g$) | 203 |
| Pore Volume ($m^3/g$) | 0.87 | Pore Volume ($m^3/g$) | 1.71 |

Example 7

Ceria Catalyst Pretreatment and Application

The catalyst precursor prepared in example 5 was loaded in a cylindrical reactor. Air flow was established at atmospheric pressure and the temperature ramped from room temperature to 400° C. at 1° C./min. The material was maintained at 400° C. for about 20 h. Afterward, the air flow was replaced by $N_2$ for 1 h and the pressure increased to 800 psi. Then, nitrogen was replaced by $H_2$. GVL was next fed to the reactor (WHSV=0.25 $h^{-1}$). Liquid products contained two phases, i.e., a bottom aqueous phase and a top organic phase. The oxygen content of the organic phase was 5-8 wt. %. The product was a mixture of different hydrocarbons and oxygenates.

Example 8

Magnesium Catalyst Pretreatment and Application

The catalyst precursor prepared in example 6 was loaded in a cylindrical reactor. Air flow was established at atmospheric pressure and a temperature ramp from room temperature-to-400° C. was started at 1° C./min. The material was maintained at 400° C. for about 20 h. Afterward, the air flow was replaced by $N_2$ for 1 h and the pressure increased to 800 psi. Then, nitrogen was replaced by $H_2$. GVL was fed neat to the reactor (WHSV=0.25 $h^{-1}$). Liquid products contained two phases, i.e., a bottom aqueous phase and a top organic phase. The oxygen content of the organic phase was 15-20 wt. %. Products were a mixture of different oxygenates and some hydrocarbons.

Example 9

Ceria Catalyst Pretreatment and Application

The ceria catalyst precursor prepared in example 5 was loaded in a cylindrical reactor. An air flow of 200 mL/min at atmospheric pressure was set and a temperature ramp from room temperature-to-400° C. was started at 1° C./min. The material was maintained at 400° C. for about 20 h. Afterwards, the air flow was replaced by $N_2$ at 500 mL/min for 1 h and the pressure increased to 800 psi. $N_2$ flow was stopped and $H_2$ flow was set at 100 mL/min, 800 psi for 1 h. At this point, tetrahydrofurfuryl alcohol was fed to the reactor at WHSV=0.25 $h^{-1}$. The product showed two phases that spontaneously separated. The organic phase contained a mixture of oxygenates and hydrocarbons. Reactant conversion stayed at 99-100% with time-on-stream.

Example 10

Noble-Metal Catalyst Application

Levulinic acid at 90 wt % was passed through a reactor containing a noble metal-based catalyst supported on silica-alumina. The reaction was conducted at 1200 psig and in the temperature range of 200~340° C. Above 270° C., levulinic acid was converted into a hydrophobic mixture of oxygenates and hydrocarbons. The levulinic acid conversion was >98% at all temperatures. The carbon yield was 97% at 275° C.; that decreased to 95% at 340° C.

Example 11

Hydrotreating Condensation/Oligomerization Product

Figure 4:
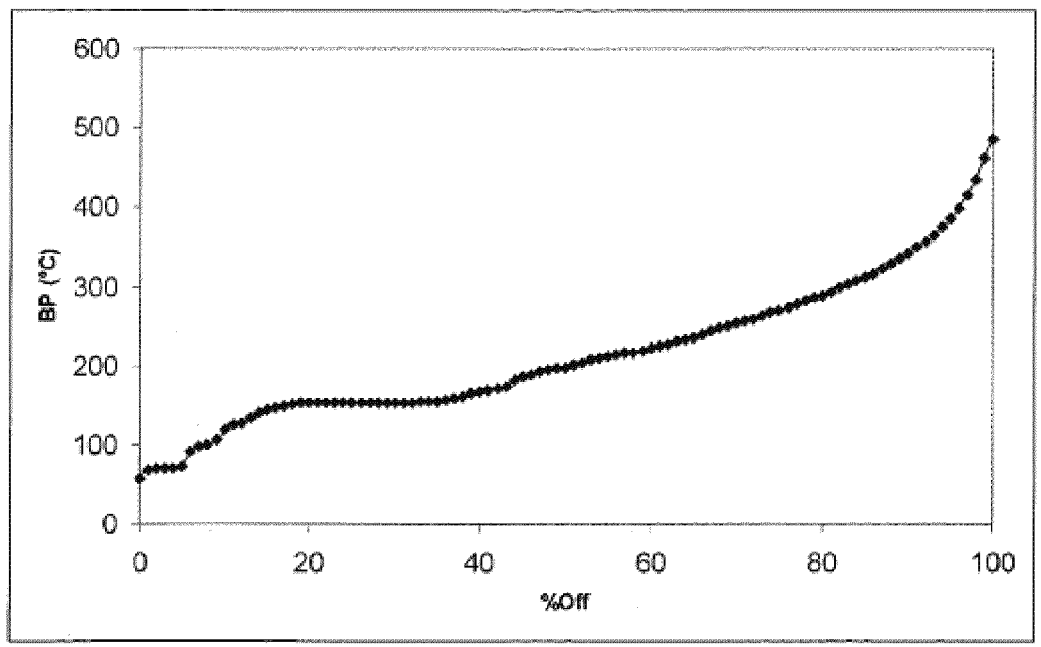
FIG. 4: SIMDIS-based boiling point curve for the liquid hydrocarbon product.

Hydrotreating of condensation/oligomerization products from example 7 was carried out using a conventional sulfided HPC. Hydrotreating conditions were the following: 290° C., 800 psi, and WHSV=0.4 h$^{-1}$. The SimDis-based boiling point curve for the liquid hydrocarbon product is shown in FIG. 4. After fractionation, different fuel fractions were collected. Table 4 shows overall yields for fuel fractions based on the amount of GVL used.

TABLE 4

Total yields for products - GVL-based

| Product | Carbon Yield (%) |
| --- | --- |
| Diesel | 21 |
| Jet | 30 |
| Gasoline (C$_{5-8}$) | 19 |
| Gasoil | 3 |
| Lights (C$_{1-4}$) | 14 |

Fuel properties for the diesel fraction are shown in Table 5. Table 5 also offers a comparison to fuel properties for conventional diesel obtained from two different sources.

TABLE 5

Fuel properties for the distillate fraction.

| | Biomass - Diesel | ULSD Source 1 | ULSD Source 2 |
| --- | --- | --- | --- |
| Cetane number (IQT) | 50 | 49 | 46 |
| Cloud point (° C.) | −45 | −27 | −7 |
| Pour point (° C.) | −51 | −34 | −15 |
| Lubricity, microns | 327 | 642 | 577 |
| Density @ 38.5° C. (g/mL) | 0.83 | 0.81 | 0.83 |
| Flash (° C.) | 104 | 74 | 63 |

Figure 5A:
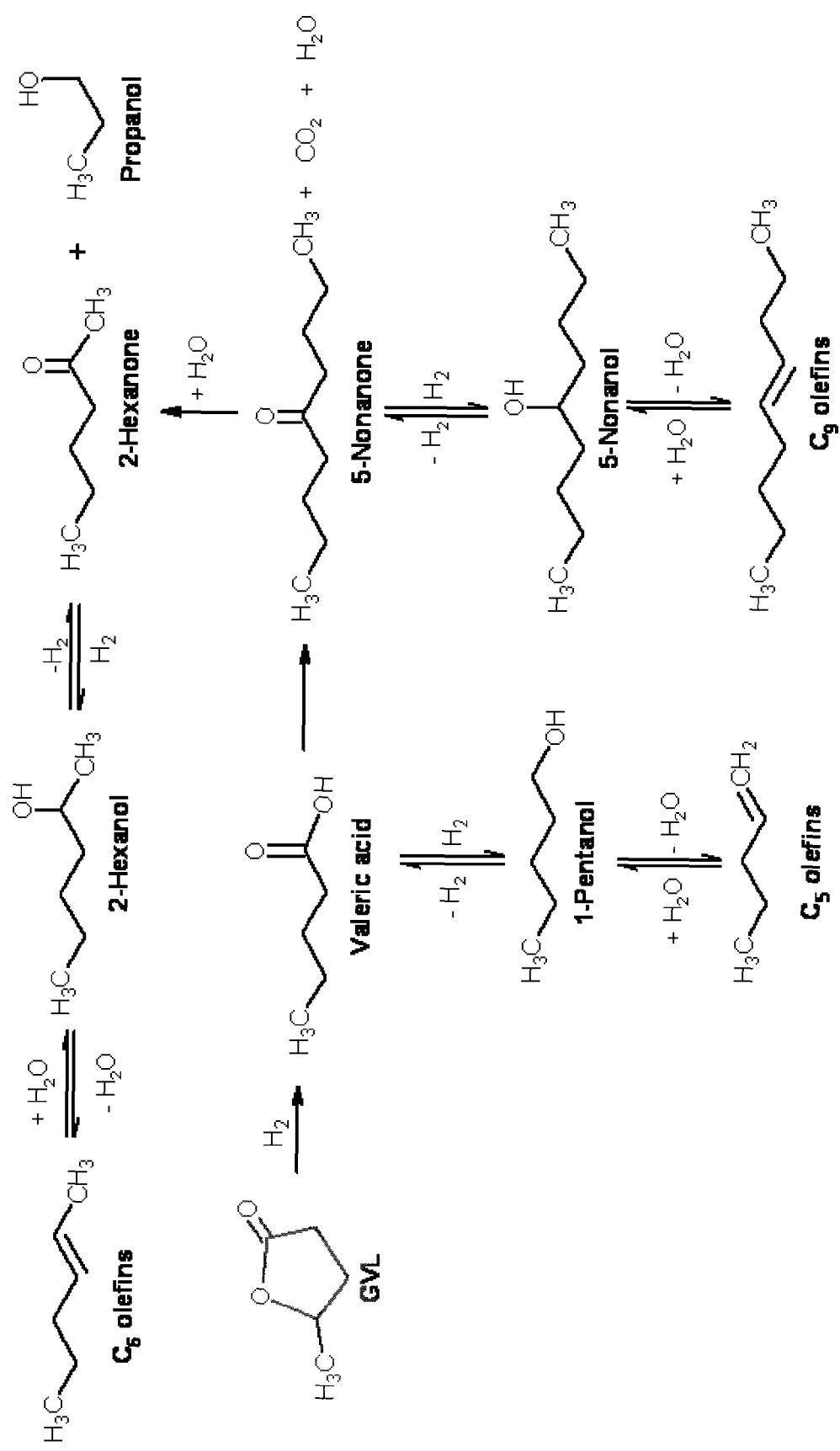
FIG. 5: Suggested reaction matrix for GVL condensation on $Cu/CeO_x/Al_2O_3$. A) Ketonization/hydrogenation/dehydration equilibra. B) Oligomerization via Guerbet/Aldol condensation
Figure 5B:
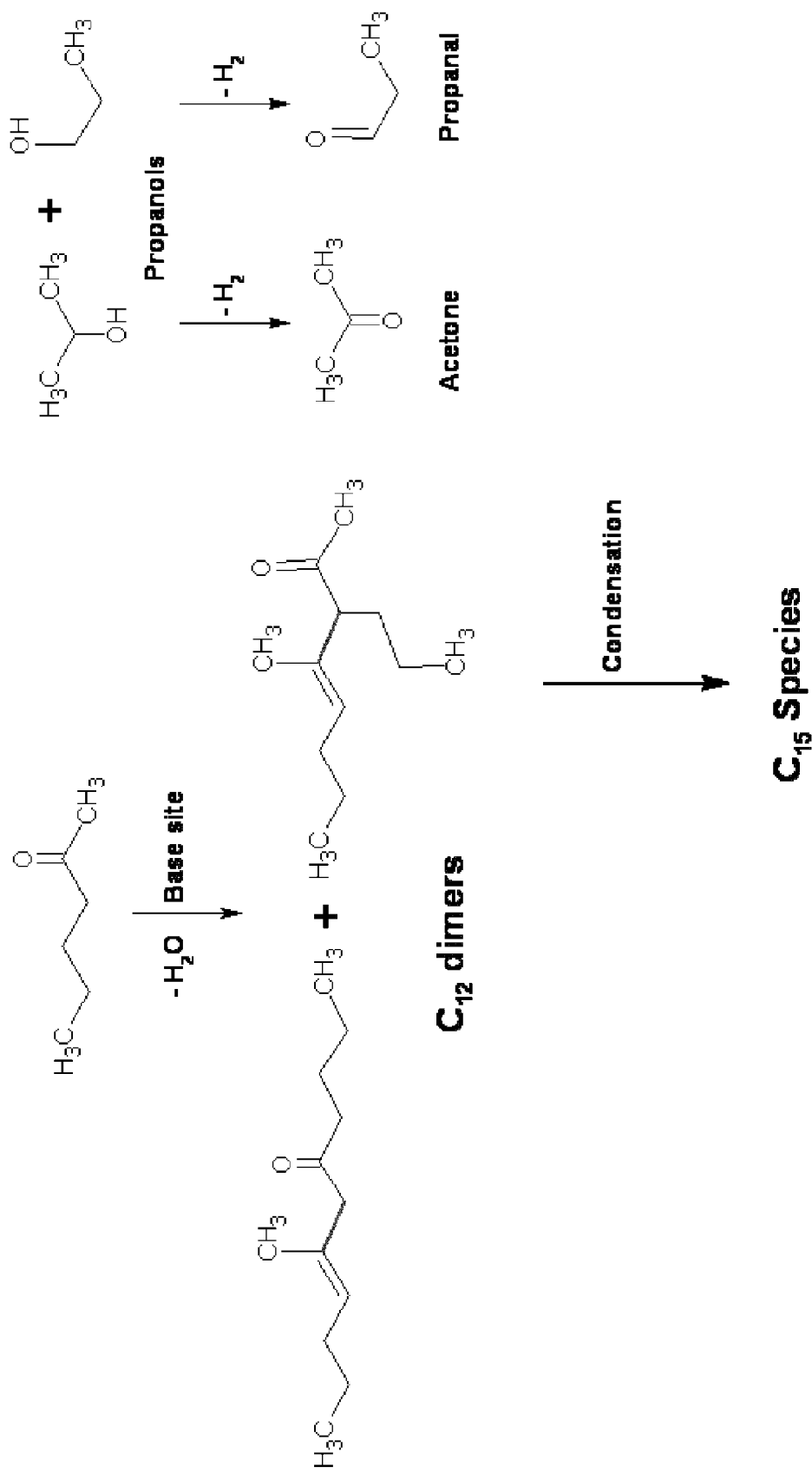

Detailed hydrocarbon analysis (DHA) and nitric oxide ionization spectrometry evaluation (NOISE) results performed on the hydrocarbon fractions obtained showed a distribution of hydrocarbon types with a wide distribution of carbon numbers. In particular, naphthenes were the dominant hydrocarbon type in this product. These results indicate that during the condensation/oligomerization stage multiple chemistries take place. Although a more detailed study is required to accurately determine the combination of chemistries leading to product formation during the condensation/oligomerization stage, FIG. 5 provides possible reaction pathways that may occur during the production of hydrocarbon precursors for jet and diesel fuel hydrocarbons. Intermediates shown in FIG. 5 were observed during the condensation/oligomerization reaction.

Example 12

Polishing Hydrotreating

Figure 6:
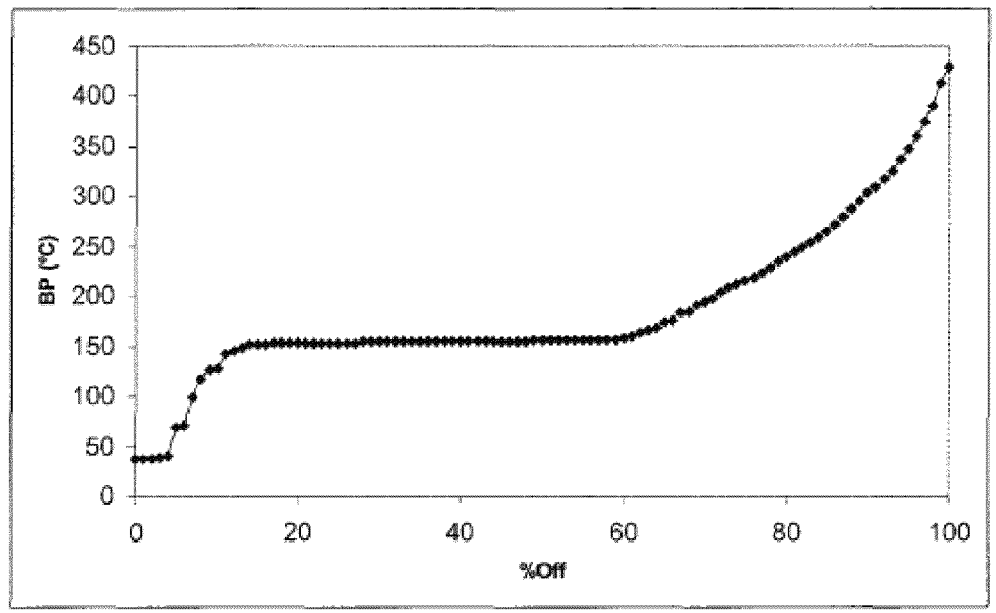
FIG. 6: SIMDIS-based boiling point curve for the liquid hydrocarbon product.

Hydrotreating of condensation/oligomerization products from example 8 was carried out using a conventional sulfided HPC. Hydrotreating conditions were the following: 290° C., 800 psi, and WHSV=0.3 h$^{-1}$. The Sim-Dis-based boiling point curve for the liquid hydrocarbon product is shown in FIG. 6.

After fractionation, different fuel fractions were collected. Table 6 shows overall yields for fuel fractions based on the amount of GVL used.

TABLE 6

Total GVL-based yields for final hydrocarbon products.

| Product | Carbon Yield (%) |
| --- | --- |
| Jet | 30 |
| Gasoline (C$_{5-8}$) | 26 |
| Heavies (heavy diesel + fuel oil) | 3 |
| Lights (C$_{14}$) | 13 |

Fuel properties for the jet fuel fraction are shown in Table 7.

TABLE 7

GVL-based jet fuel properties.

| | Biomass - Jet | Jet A/A-1 Kerosene ASTM International (USA) |
| --- | --- | --- |
| Net Heat of Comb. (MJ/kg) | 43.9 | Min. 42.8 |
| Flash Point (° C.) | 34.4 | Min. 39 |
| Density @ 15° C. (g/mL) | 0.78 | 0.775-0.840 |
| Freezing Point (° C.) | −67 | Max. −40 Jet A |
| Smoke point (mm) | 32.5 | Min. 25 |

Example 13

Polishing Hydrotreating

Figure 7:
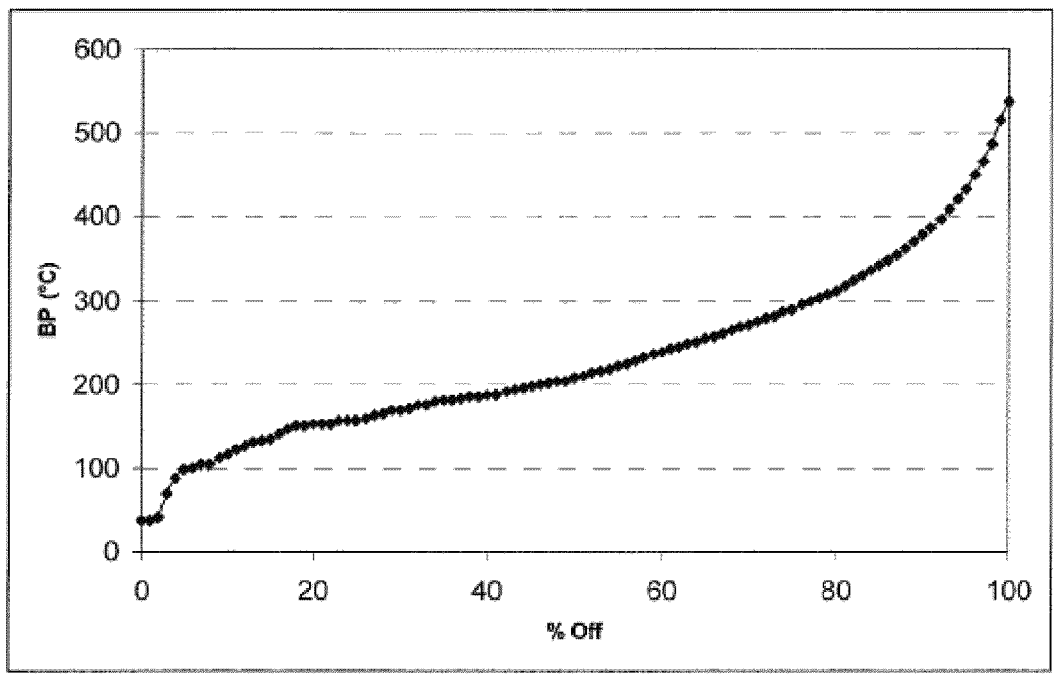
FIG. 7: SimDis-based true boiling point curve for the liquid product.

Hydrotreating of condensation/oligomerization products from example 8 was carried out using a conventional sulfided hydrotreating catalyst. Hydrotreating conditions were the following: 290° C., 800 psi, and WHSV=0.4 h$^{-1}$. The Sim-Dis-based boiling point curve for the liquid hydrocarbon product is shown in FIG. 7.

Table 8 shows overall carbon yields for fuel fractions based on the Sim-Dis result, quantification of gas products, and amount of tetrahydrofurfuryl alcohol used.

TABLE 8

Carbon Yields

| Product | % C |
| --- | --- |
| Gasoline | 35 |
| Jet | 15 |
| Diesel | 22 |
| Fuel oil | 9 |
| C$_{1-4}$ | 7 |

Example 14

Preparation of 5% Ni/5%/Cu/20% PrOx/Al2O3 Catalyst 25.06 g of Pr(NO$_3$)$_3$ and deionized water were set in 500 mL beaker. 6.72 g of Cu(NO$_3$)$_2$ and 8.37 g of Ni(NO$_3$)$_2$ were added. The salts were wet impregnated on 40 g of Davison 1×1.4 mm Al$_2$O$_3$ beads. The water was then evaporated. The material was oven dried at 120° C. for 12 hours and calcined at 400° C. for 8 hours.

Example 15

Condensation of Sorbitol on 5% Ni5%/Cu/20% PrOx/Al2O3 Catalyst

Figure 8:
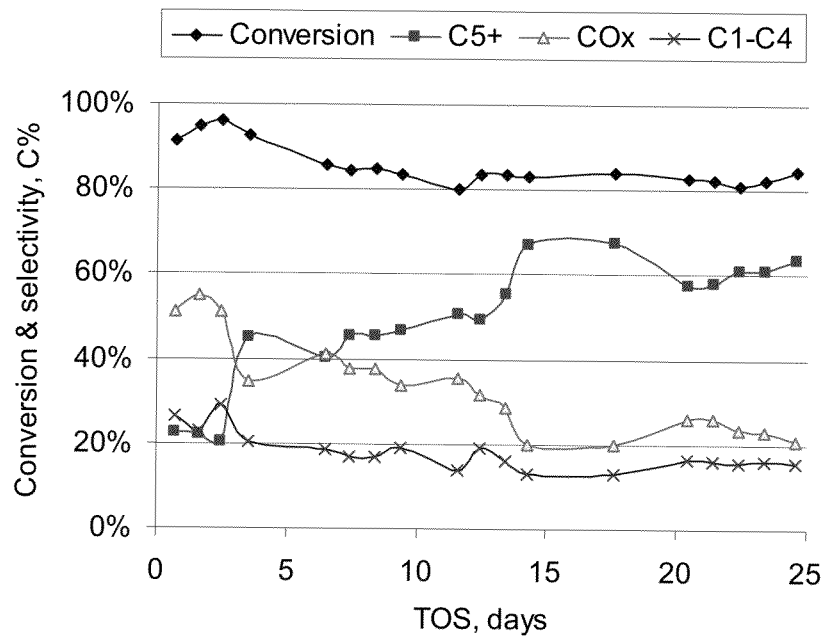
FIG. 8: Conversion and selectivity (mole carbon basis) for the sorbitol condensation/hydrotreating on a $NiCuPrO_x/Al_2O_3$ catalyst.
Figure 9:
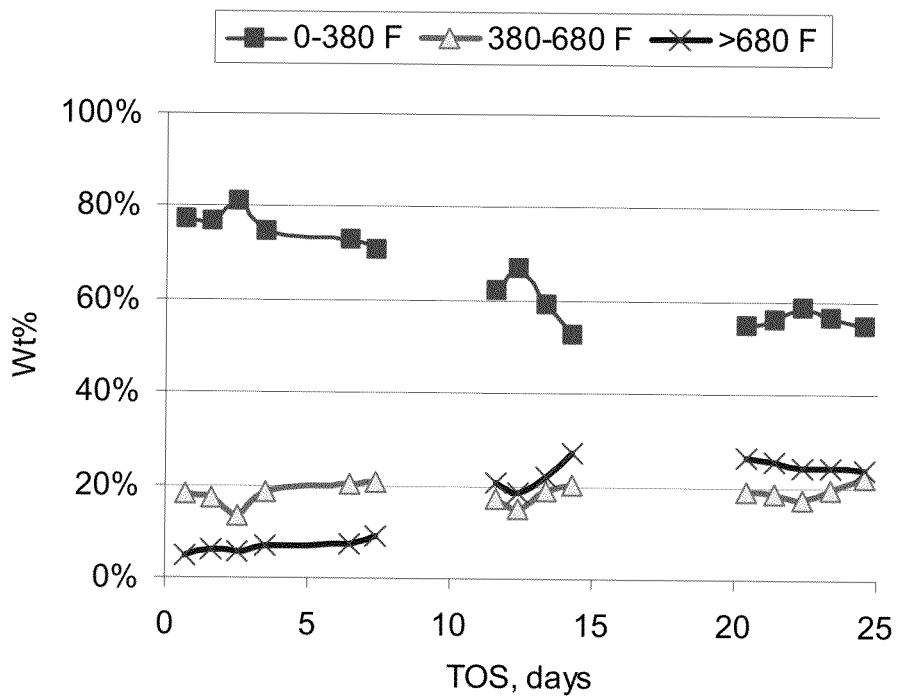
FIG. 9: Reconstituted SIMDIS cuts of the hydrocarbon products from sorbitol condensation/hydrotreating on a $NiCuPrO_x/Al_2O_3$ catalyst followed by hydrotreating on a sulfur-free NiMoW catalyst.

The reactor was packed with two beds. The first bed was the 5% Ni5%/Cu20% PrOx/Al$_2$O$_3$ catalyst (30 ml) for condensation while the second bed was a NiMoW catalyst (7.5 ml, mixed with 7.5 alundum) for hydrodeoxygenation. The reaction conditions were 1000 psig, 350° C., LHSV 0.3 h$^{-1}$ for 40 wt % sorbitol solution, and feed H/C ratio of 2. The conversion of sorbitol was 80-95% based on the carbon present in the aqueous product. The C5+ selectivity was 60% after 13 days on stream, as shown in FIG. 8. After 13 days on stream, the hydrocarbon products were composed of approximately 56% gasoline, 18% diesel, and 26% gas oil, as shown in FIG. 9. The system was run for a total of 650 hours.

Example 16

Preparation of 10% Co/PrOx/Al2O3 Catalyst

A Co/PrOx/Al2O3 catalyst was prepared as described in example 1, but using Co instead of Ni and Cu.

Example 17

Condensation of Sorbitol on 10% CoPrOx/Al2O3 Catalyst

Figure 10:
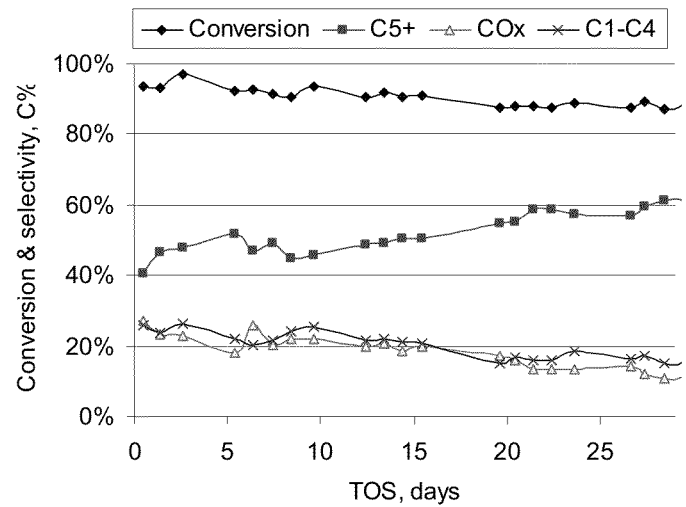
FIG. 10: Conversion and selectivity of sorbitol conversion on a Co/PrOx catalyst (mole carbon basis).
Figure 11:
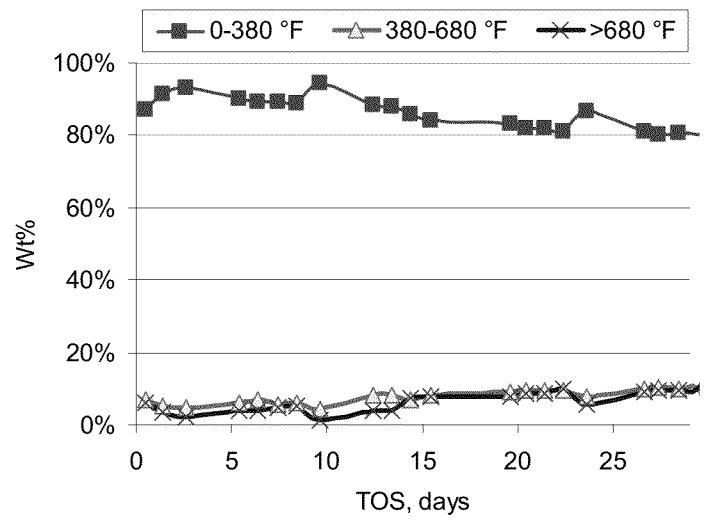
FIG. 11: Reconstituted SIMDIS cuts of the hydrocarbon products from the reaction of sorbitol on a Co/PrOx catalyst

The reactor was packed with two beds. The first bed was the 10% CoPrOx/Al$_2$O$_3$ bed (10 ml) for condensation and the second bed was NiMoW catalyst (20 ml, mixed with 10 ml alundum) for hydrodeoxygenation. The reaction conditions were 1000 psig, 350° C., LHSV 0.8 h$^{-1}$ for 40 wt % sorbitol solution (w.r.t. the condensation catalyst), and feed H/C ratio of 4. The conversion of sorbitol was greater than 87% based on carbon content in the aqueous product. The C5+ selectivity was greater than 60% after 22 days on stream, as shown in FIG. 10. After 20 days on stream, the hydrocarbon products were composed of approximately 80% gasoline, 10% diesel, and 10% gas oil, as shown in FIG. 11. The system was run for a total of 840 hours.

Fuel range, including gasoline, Jet fuel, Diesel, and fuel oil were produced from a variety of oxygenates using a very flexible system. A variety of oxygenates were treated through hydrogenation, condensation/oligomerization, and polishing. Product production was tuned by adjusting temperature, flow rate, hydrogen concentration, and/or pressure. This allowed the conversion of many different oxygenates to a variety of fuel range hydrocarbons including light gases, gasoline, jet fuel, diesel, and fuel oil. The commercial conversion of biomass oxygenates to fuel products provides a fungible source of fuel products for use in existing fuel infrastructures.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication date after the priority date of this application. Incorporated references are listed again here for convenience:
1. U.S. Pat. No. 3,752,849, Otsuka, et al., "Manufacture of Levulinic Acid." Otsuka Kagaku Yakuhin (1973).
2. U.S. Pat. No. 4,897,497, Fitzpatrick, "Lignocellulose degradation to furfural and levulinic acid." Biofine, Inc. (1990).
3. U.S. Pat. No. 5,608,105, WO9640609, Fitzpatrick, "Production of levulinic acid from carbohydrate-containing materials." Biofine, Inc. (1997).
4. U.S. Pat. No. 7,265,239, US2007049771, WO2007023173, Van De Graaf and Lange, "Process for the Conversion of Furfuryl Alcohol into Levulinic Acid or Alkyl Levulinate" Shell Oil Company (2007).
5. Alonso, et al., "Production of liquid hydrocarbon transportation fuels by oligomerization of biomass-derived C$_9$ alkenes." Green Chem. 12:992-999 (2010).
6. Biometic, "I. Commercialization of the biofine technology for levulinic acid production from paper sludge." Waltham, Mass., Apr. 23, (2002).
7. Bond, et al., "Integrated catalytic conversion of gammavalerolactone to liquid alkenes for transportation fuels." Science 327:1110-4 (2010).
8. Chen, et al., "Liquid phase hydrogenation of furfural to furfuryl alcohol over Mo-doped Co—B amorphous alloy catalysts." Appl. Cat. A. 233:13-20 (2002).
9. De Jong, and Marcotullio, "Overview of Biorefineries based on Co-Production of Furfural, Existing Concepts and Novel Developments." Int. J. of Chem. Reac. Eng., 8:1-24 (2010).
10. Fitzpatrick, "The Biofine Technology: A 'Bio-Refinery' Concept Based on Thermochemical Conversion of Cellulosic Biomass." ACS Symposium Series: Washington, D.C., Feedstocks for the future, 271-87 (2006).
11. Lange, et al., "Conversion of Furfuryl Alcohol into Ethyl Levulinate using Solid Acid Catalysts." ChemSusChem 2:437-41 (2008).
12. Olson, et al., "Levulinate esters from biomass wastes." ACS Symposium Series, 784:51-63 (2001).
13. Serrano-Ruiz, et al., "Catalytic upgrading of levulinic acid to 5-nonanone." Green Chem. 12:574-7 (2010).
14. Serrano-Ruiz and Dumesic, "Catalytic routes for the conversion of biomass into liquid hydrocarbon transportation fuels." Energy Environ. Sci. 4:83-99 (2011).
15. Wu, et al., "Vapor phase hydrogenation of furfural to furfurayl alcohol over environmentally friendly Cu—Ca/SiO$_2$ Catalyst." Cat. Comm. 6:633-637 (2005).
16. Xing, et al., "Production of jet and diesel fuel range alkanes from waste hemicellulose-derived aqueous solutions." Green Chem. 12:1933-1946 (2010).

The invention claimed is:
1. A method of converting biomass oxygenates into hydrocarbon fuels comprising:
   a) providing a biomass derived oxygenate feed;
   b) hydrogenating the oxygenate feed with hydrogen and a hydrogenation catalyst to produce a hydrogenated product;

c) condensing the hydrogenated product with a condensation catalyst to produce a condensed or oligomerized product;

d) polishing the condensed or oligomerized product with a hydroprocessing catalyst (HPC) to produce hydrocarbon range fuel products; and e) isolating one or more hydrocarbon range fuel products; further including the step of separating alcohol from the hydrogenated product prior to condensing the hydrogenated product with the condensation catalyst.

2. The method of claim 1, wherein said oxygenate feedstock is derived from a biomass selected from the group consisting of sugars, carbohydrates, lignins, fatty acids, proteins, oils, eucalyptus oil, forest residues, dead trees, branches, leaves, tree stumps, yard clippings, wood chips, wood fiber, sugar beets, miscanthus, switchgrass, hemp, corn, corn fiber, poplar, willow, sorghum, sugarcane, palm oil, corn syrup, algal cultures, bacterial cultures, fermentation cultures, paper manufacturing waste, farming residues, food manufacturing waste, meat processing waste, municipal solid waste, animal waste, biological waste, sewage, and combinations thereof.

3. The method of claim 1, wherein said oxygenate feedstock comprises one or more oxygenates selected from the group consisting of carbohydrates, sugars, pentoses, hexoses, monosaccharides, dextrose, glucose, α-D-glucopyranose, β-D-glucopyranose, α-D-glucofuranose, β-D-glucofuranose, fructose, galactose, disaccharides, levoglucosan, sucrose, manose, glucose, xylose, isosorbide, lactose, maltose, fructose, cellobiose, melibiose, raffinose, glyceraldehyde, erythritol, xylitol, sorbitol, arabitol, mannitol, sorbitol, dulcitol, maltitol, arabinitol, isosorbide, glycerol, glycerin, alcohol, methanol (MeOH), ethanol (EtOH), isopropyl alcohol (IPA), butanol (BuOH), n-butanol, t-butanol, ethers, methyl tert-butyl ether (MTBE), tertiary amyl methyl ether (TAME), tertiary hexyl methyl ether (THEME), ethyl tertiary butyl ether (ETBE), tertiary amyl ethyl ether (TAEE), diisopropyl ether (DIPE), hydroxymethyl-tetrahydrofuran or tetrahydro-2-furfuryl alcohol (THFA), methyl-tetrahydrofuran, 2-methyltetrahydrofuran, 3-methyltetrahydrofuran, tetrahydrofuran, diols, methanediol ($H_2C(OH)_2$), ethylene glycol, propane diols, 1,2-propanediol, 1,3-propanediol, butanediols, 1,2-butanediol, 1,3-butanediol, 1,4-butanediol, 2,3-butanediol, pentane diols, 1,2-pentanediol, 1,5-pentanediol, octanediol, 1,8-octanediol, etohexadiol, p-menthane-3,8-diol, 2-methyl-2,4-pentanediol, aldehydes, propanal, butanal, 2,5-furan-diacrboxyaldehyde, carboxylates, acetic acid, oxopropanoic acid, acrylic acid, levulinic acid, succinic acid, 2,5-furan-dicarboxylic acid, aspartic acid, glucaric acid, glutamic acid, itaconic acid, acetylacrylic acid, 4-O-Me-glucuronic acid, gluconic acid, xylonic acid, esters, levuninate esters, lactones, valero lactone, α-methylene-γ-valerolactone, angelica lactones, trisaccharides, oligosaccharides, polysaccharides, starch, derivatives, dimers, trimers, and polymers thereof.

4. The method of claim 1, further comprising one or more of the following reaction conditions:

a) wherein said oxygenate is hydrogenated at temperatures between approximately 100 and 400° C. and pressures between approximately 100-1200 psig;

b) wherein said hydrogenated product is condensed and/or oligomerized at temperatures between approximately 200 and 600° C. and pressures between approximately 100-1200 psig; and c) wherein said condensed and/or oligomerized product is polished at temperatures between approximately 200 and 400° C. and pressures between approximately 100-2000 psig.

5. The method of claim 1:

a) wherein said hydrogenation catalysts is selected from the group consisting of ceria (Ce), magnesium (Mg), nickel (Ni), cobalt.(Co), gold (Au), iridium (Ir), osmium (Os), palladium (Pd), platinum (Pt), rhodium (Rh), ruthenium (Ru) and combinations thereof;

b) wherein said condensation catalyst is selected from the group consisting of alumina, silica, silica-alumina, zirconia, titania, ceria, manganese oxide, magnesium, praseodymium oxide, samarium oxide, and combinations thereof;

c) wherein said condensation catalyst has a promoter selected from the group consisting of copper (Cu), nickel (Ni), cobalt (Co), Iron (Fe), gold (Au), iridium (Ir), osmium (Os), palladium (Pd), platinum (Pt), rhodium (Rh), and combinations thereof;

d) wherein said polishing catalyst is selected from the group consisting of molybdenum (Mo), tungsten (W), cobalt (Co), nickel (Ni), NiW, NiMo, CoMo, and combinations thereof; or e) wherein said polishing catalyst support is selected from the group consisting of carbon, alumina, silica, zeolite, ceramic, $Al_2O_3$, and the like.

6. The method of claim 1, wherein said hydrocarbon range fuel products are distilled to one or more renewable hydrocarbon fuels selected form the group consisting of gasoline, diesel, and jet-fuel.

7. The method of claim 1, wherein said renewable hydrocarbon fuel products comprise naphthene hydrocarbons and mixtures thereof.

8. The method of claim 1, comprising:

a) hydrogenation selected from one of the following conditions:

i) wherein said oxygenate comprises levulinic acid, said hydrogenation catalyst is ruthenia-carbon catalyst, said temperature is approximately 100-150° C., said pressure is approximately 400-1000 psig, or ii) wherein said oxygenate comprises levulinic acid, said hydrogenation catalyst is a nickel-based catalyst, said temperature is approximately 200-250° C., said pressure is approximately 800-1000 psig;

b) condensation selected from one of the following conditions:

i) wherein said hydrogenated product comprises gamma-valerolactone (GVL), said condensation catalyst is ceria-alumina, said temperature is approximately 400° C. and said pressure is approximately 800-1000 psig, ii) wherein said hydrogenated product comprises gamma-valerolactone (GVL), said condensation catalyst is magnesia-alumina, said temperature is approximately 400° C. and said pressure is approximately 800-1000 psig, iii) wherein said hydrogenated product comprises tetrahydrofurfuryl alcohol, said condensation catalyst is ceria-alumina, said temperature is approximately 400° C. and said pressure is approximately 800-1000 psig, iv) wherein said hydrogenated product comprises levulinic acid, said condensation catalyst is a noble-metal catalyst, said temperature is approximately 200-340° C. and said pressure is approximately 1200 psig, v) wherein said hydrogenated product comprises sorbitol, said condensation catalyst is a Co/praseodymium oxide-alumina catalyst, said temperature is approximately 280-400° C. and said pressure is approximately 800-1200 psig, or vi) wherein said hydrogenated product comprises a levulinic acid/formic acid mixture said condensation catalyst is a NiCu/praseodymium oxide-alumina catalyst, said temperature is approximately 280-400° C. and said pressure is approximately 800-1200 psig; and c) polishing selected from one of the following conditions:
i) wherein said polishing catalyst is a sulfided hydroprocessing catalyst, said temperature is approximately 240-8380° C., and said pressure is approximately 800-81800 psi,
ii) wherein said polishing catalyst is a sulfided hydroprocessing catalyst, said temperature is approximately 240-320° C., and said pressure is approximately 800-1200 psi,
iii) wherein said polishing catalyst is a sulfided hydroprocessing catalyst, said temperature is approximately 280-350° C., and said pressure is approximately 800-1200 psi, wherein said polishing catalyst is a non-sulfided hydroprocessing catalyst, said temperature is approximately 280-350° C., and said pressure is approximately 800-1200 psi, or
iv) wherein said polishing catalyst is a non-sulfided hydroprocessing catalyst, said temperature is approximately 280-380° C., and said pressure is approximately 800-2000 psi.

9. The method of claim 1, comprising a product with naphtha, renewable distillate, VGO range fraction comprising naphtha range hydrocarbons with, distillate range hydrocarbon fuel comprising hydrocarbons, vacuum gas oil (VGO) range hydrocarbons, and combinations thereof wherein said renewable distillate range fraction comprises:
i) approximately 1 to 12 wt % paraffins;
ii) approximately 60 to 80 wt % naphthenes;
iii) approximately 15 to 40 wt % 1-ring naphthenes;
iv) approximately 20 to 40 wt % 2-ring naphthenes;
v) approximately 5 to 15 wt % 3-ring naphthenes; and
vi) approximately 0 to 20 wt % aromatics.

10. The method of claim 1, comprising a product with renewable naphtha, distillate, VGO range hydrocarbons with fraction comprising naphtha range hydrocarbon fuel comprising hydrocarbons, distillate range hydrocarbons, vacuum gas oil (VGO) range hydrocarbons, and combinations thereof wherein said renewable naphtha fraction comprises:
i) approximately 2 to 30 wt % paraffins;
ii) approximately 50 to 80 wt % naphthenes; and
iii) approximately 0 to 10 wt % aromatics.

11. The method of claim 1, comprising a product with renewable distillate or vacuum gas oil (VGO) fraction comprising distillate range hydrocarbons, VGO range hydrocarbons, and combinations thereof wherein said renewable distillate fuel fraction has:
i) a density between approximately 0.75 and 0.95;
ii) an oxygen content between approximately 1.00 and 0.01;
iii) a cetane between approximately 40 and 60;
iv) a cloud point between approximately −55° F. and −75° F.; and
v) a pour point between approximately −70° F. and −88° F.

12. The method of claim 1, comprising a product with renewable naphtha fuel comprising naphtha range hydrocarbons wherein said renewable naphtha fuel fraction has
i) a density between approximately 0.65 and 0.80;
ii) an oxygen content between approximately 1.00 and 0.01; and
iii) a calculated octane between approximately 45 and 65.

* * * * *